Jan. 24, 1961  H. G. ANASTASIA ET AL  2,968,964
MULTIPLE TURN CAM CORRECTOR
Filed Feb. 23, 1960   2 Sheets-Sheet 1

INVENTORS
HARRY G. ANASTASIA
WILLIAM F. WATSON
BY Herbert L. Davis
ATTORNEY

INVENTORS
HARRY G. ANASTASIA
WILLIAM F. WATSON
By Herbert L. Davis
ATTORNEY

REISSUED JAN 1 4 1964

RE 25-513

United States Patent Office 2,968,964
Patented Jan. 24, 1961

2,968,964

MULTIPLE TURN CAM CORRECTOR

Harry G. Anastasia, Paramus, and William F. Watson, Fairlawn, N.J., assignors to The Bendix Corporation, a corporation of Delaware Filed Feb. 23, 1960, Ser. No. 10,466

7 Claims. (Cl. 74—395)

The invention relates to a multiple turn cam corrector and more particularly to a mechanism for adjusting the relation between rotary motions at input and output shafts by adding to or subtracting from the rotation imparted to the output shaft by the input shaft in a highly accurate and precise manner.

The foregoing mechanism may be utilized to advantage as in the case, for example, where the rotational output of a device is to be fitted to a predetermined curve or where a non-linear output is to be converted to a straight line output with extreme accuracy.

An object of the invention is to provide a novel multiple turn cam corrector mechanism in which the rotational movement to be corrected is applied to an input gear shaft resulting in rotation of an input pinion secured to a differential housing having an output pinion driven by a differential correction gearing within the housing and in which arrangement the input pinion secured to the differential housing is screw threadedly engaged on a screw threaded shaft projecting through the input pinion and differential housing and fixedly mounted so that rotation of the input pinion imparts linear as well as rotary motion to the differential housing and gear assembly therein along the axis of the threaded fixed shaft.

Another object of the invention is to provide in the aforenoted mechanism a roller assembly carried by the differential housing and so arranged as to follow an adjustable helical track so that in addition to the combination of rotary and linear motions imparted to the differential housing through the coaction of the input gear and threaded shaft, there is imparted by suitable variations in the radius of the helical track a radial movement to the roller assembly in following the helical track and an additional correction adjustment to the differential gearing within the housing to which the roller assembly is drivingly connected so as to add to or subtract from the rotational movement imparted through the differential gearing to the output pinion by the input pinion and which correction adjustment is determined by the helical contour of the track in such a manner as to effect an extreme accuracy of control of the output movement applied to the output pinion and output shaft driven thereby.

Another object of the invention is to provide a novel adjustable cam construction including an adjustable helical track cooperating through a novel cam follower and differential gear assembly driven by the cam follower so as to correct the movement imparted to an output shaft by an input shaft in accordance with a predetermined schedule and in a highly accurate and precise manner.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figures 1, 2:
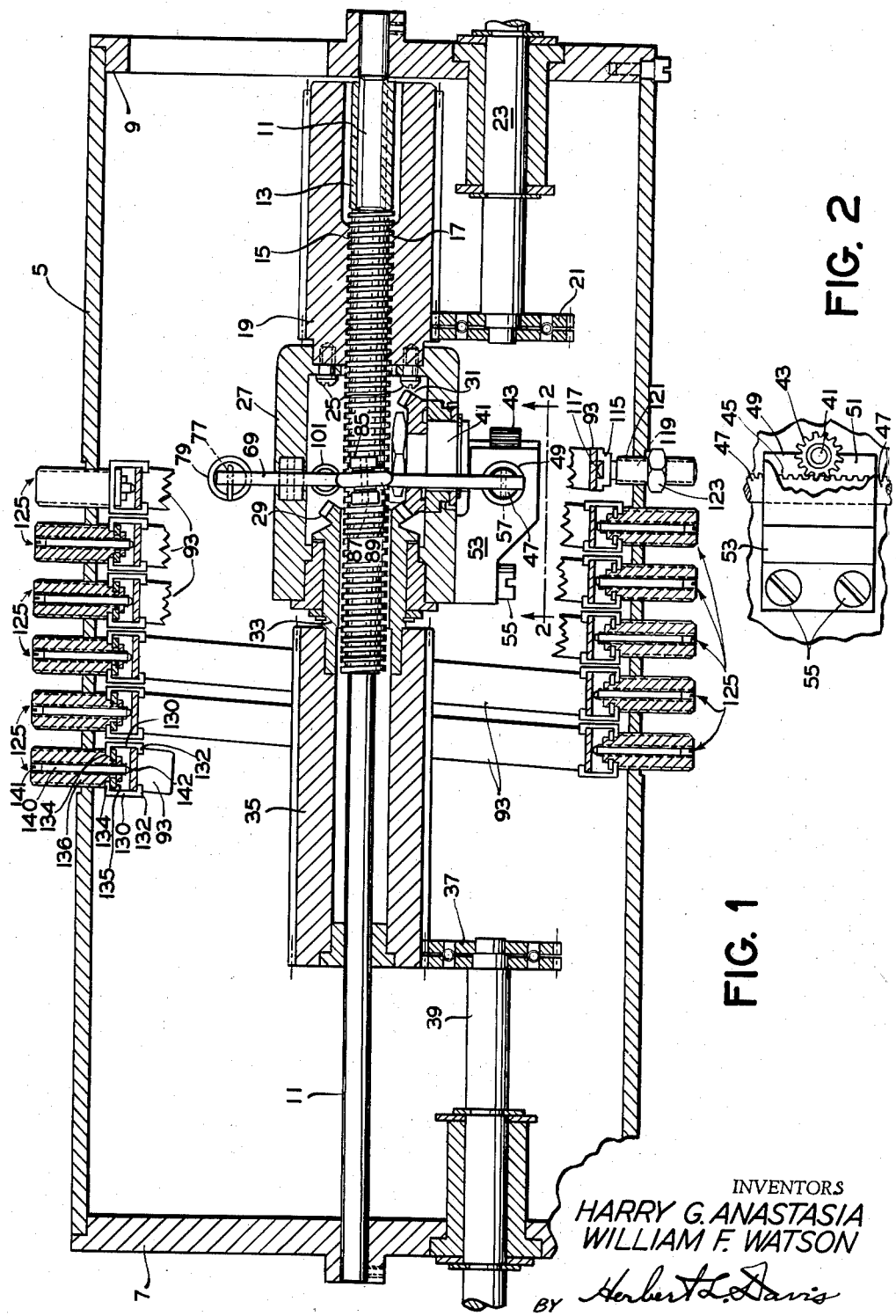
Figure 1 is a sectional view of the multiple turn cam corrector mechanism taken along the lines 1—1 of Figure 3 and looking in the direction of the arrows.
Figure 2 is a fragmentary view of the cam follower motion correction rack and pinion as viewed along the lines 2—2 of Figure 1 and looking in the direction of the arrows.
Figure 3:
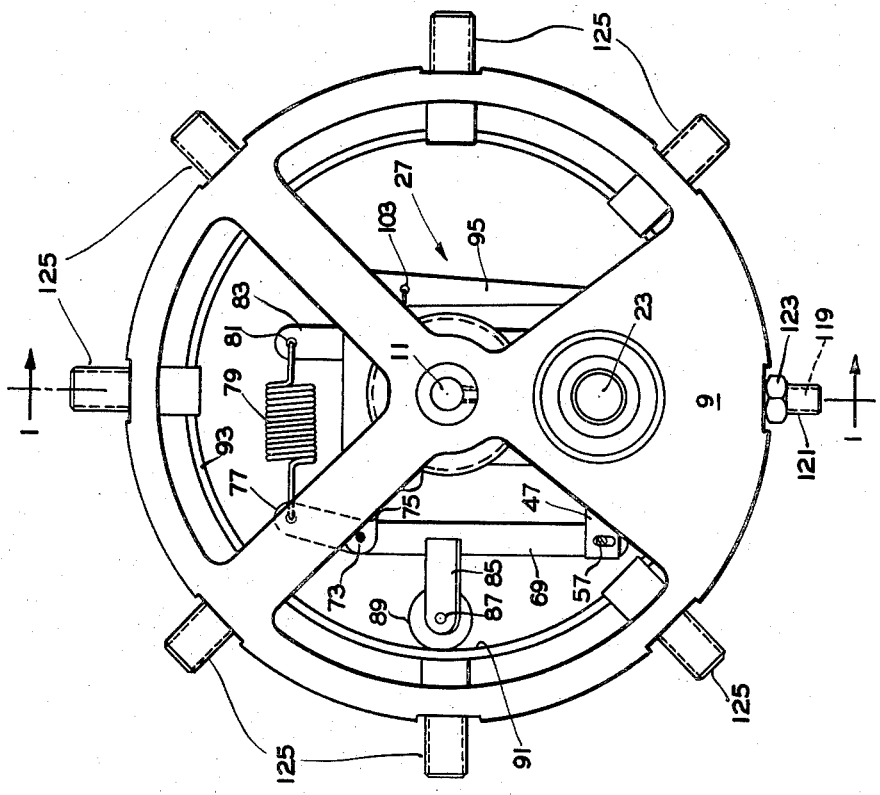
Figure 3 is an end view of the multiple turn cam corrector of Figure 1.

Referring to the drawings of Figures 1 and 3, there is indicated by the numeral 5 a barrel having end members 7 and 9 affixed to the barrel and supporting a fixed shaft 11 therebetween.

Secured to the shaft 11 by suitable splines is a sleeve 13 having screw threads 15 provided thereon for engagement with internal screw threads 17 provided within an input pinion 19. The pinion gear 19 is in turn engaged by a spur gear 21 drivingly connected to an input shaft 23.

The input pinion 19 is fastened by suitable bolts 25 to one end of a differential housing 27. The differential housing 27 has rotatably mounted therein bevel gears 29 and 31 operatively engaged one with the other. The bevel gear 29 is affixed to a spur shaft 33 which is in turn drivingly connected to an output pinion 35 rotatably mounted on the fixed shaft 11. The output spur gear 35 drivingly engages a gear 37 affixed to an output shaft 39.

The bevel gear 31 is drivingly connected to a shaft 41 rotatably mounted in the differential housing 27. There is affixed at an outer end of the shaft 41 a pinion gear 43 having teeth operatively engaged in a rack 45 carried by rod 47. The rod 47 is slidably supported in bearing members 49 and 51 carried by a member 53 which is fastened by bolts 55 to the differential housing 27.

Figure 4:
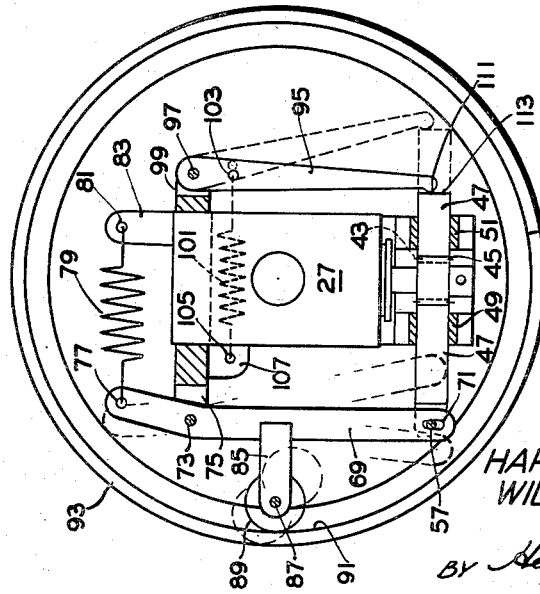
Figure 4 is a diagrammatic view illustrating the operation of the cam follower assembly.

As shown schematically in Figure 4, the rod 47 has pivotally connected in a bifurcated end thereof by a pin 57 an arm 69 having a slot 71 within which the pin 57 is slidably mounted. The arm 69 is in turn pivotally supported at a point intermediate its opposite ends by a pin 73 carried by a bifurcated flange portion 75 of the differential housing 27. A free end of the arm 69 has connected thereto at 77 one end of a resilient coil spring 79 which has the opposite end thereof connected at 81 to a flange portion 83 of the differential housing 27. The arrangement is such that the spring 79 biases the arm 69 in a clockwise direction about the pin 73 tending to move the rod 47 as viewed in Figure 4 toward the left.

Further, projecting from the arm 69 at a point intermediate the pivot pin 73 and the pin 57 is a bifurcated arm portion 85 having rotatably supported therein by a pin 87 a roller 89 arranged to contact the inner surface 91 of a helical ribbon-like cam track 93 formed of a suitable flat flexible material such as spring steel.

As shown schematically in Figure 4, an arm 95 is pivotally connected by a pin 97 to a bifurcated flange portion 99 of the differential housing 27 and biased by a coil spring 101 connected at one end 103 to the arm 95 and at the opposite end 105 to a flange portion 107 so that the arm 95 is biased in a clockwise direction and a free end portion 111 of the arm 95 into contacting relation with an end portion 113 of the rod 47. The spring 101 thereby in effect furthers the biasing action thereon of the spring 79 so as to cause the arm 69 to hold roller 89 in contacting relation with the inner surface 91 of the helical track 93 under the biasing forces of the springs 79 and 101.

It will be seen that under the aforedescribed arrangement the cam follower roller 89 will follow the surface of the helical track 93 and as the radius of the inner surface 91 thereof varies with the predetermined setting of the track 93, the rod 47 will be adjusted to the left or right as the case may be, causing the rack 45 to impart rotary movement to the correction spur gear 43 with such adjustment. This, in turn, will effect an adjustment of the bevel gear 31 and the inner engaged bevel gear 29 to impart a predetermined rotary correction movement to the output pinion gear 35 operatively connected thereto.

The helical track 93, as best shown in Figures 1 and 3, is adjustably supported within the interior of the barrel 5 for cooperative engagement with the roller 89. As shown in Figure 1, one end of the track 93 is affixed to a bracket portion 115 in which is operatively engaged an end 117 of a pin 119 screw threadedly engaged in a sleeve 121 and longitudinally adjustable therein by rotary adjustment of a head portion 123 of a nut fixedly mounted on the sleeve 121. Thus, by rotary adjustment of a sleeve 121 screw threadedly engaging the pin 119, the bracket 115 and thereby the end of the track 93 may be adjusted inwardly or outwardly of the barrel 5 to vary the effective radius of the inner surface 91 of the end portion of the helical track 93.

The helical track 93, formed of a suitable flexible material such as spring steel, presents a good bearing surface 91 the contour of which may be readily varied by the adjustment of suitable mounting means. Thus, located around the barrel 5, as shown in Figures 1 and 3, are a series of adjustable mounting screws indicated generally by the numeral 125 effective for supporting the helical track 93 and upon suitable adjustment to vary the effective contour of the inner surface 91 of the helical track 93 so as to cooperate with the roller 89 to produce the required corrective action and provide a predetermined adjustment of the output pinion 35.

The adjustable mounting screws 125 include, as shown in Figure 1, mounting bracket portions 130 having flange portions 132 and 134 engaging respectively an inner surface of the helical ribbon-like track 93 and a flange member 135 at an inner end of a body portion 136 of the adjustment screw 125. The body portion 136 is in turn screw threadedly engaged with suitable screw threads formed in an aperture in the barrel portion 5 so that upon rotary adjustment of the body portion 136 of the adjustment screw 125 such body portion may be adjusted inwardly or outwardly with respect to the barrel 5 to cause a corresponding radial adjustment of that portion of the helical track 93 carried thereby.

Further, screw threadedly engaged within the body portion 136 is an auxiliary adjustment screw 140 having a cleft portion 141 for operative engagement by a screw driver and an inner end 142 normally bearing on an outer surface of the helical track 93. Thus the helical track 93 may be normally fastened in the bracket 130 between the end portion 142 of the auxiliary adjustment screw 140 and the flange portions 132 of the bracket 130. The auxiliary adjustment screw 140 has provided suitable screw threads engaging internal screw threads formed in the body portion 136 so that by rotary adjustment of the screw 140 the end portion 142 may be adjusted inwardly or outwardly in the bracket 130 relative to the outer surface of the helical track 93.

In the aforenoted arrangement, it will be seen that a change in the contour of the flexible helical track 93 to effect the required predetermined corrective action may be brought about by suitable adjustment of the body portions 136 of the adjustment screws 125 which, as shown in Figure 3, are conveniently located about the barrel 5. Moreover, changes in the effective length of the flexible track 93 which occur as the result of raising or lowering one or more of the body portions 136 of the several adjustment screws 125 may be conveniently accommodated by releasing the pressures applied by the auxiliary adjustment screws 140 on the flexible track 93 and allowing the track 93 to "float" in the several mounting bracket portions 130 prior to any adjustment of the body portions 136 of the several adjustment screws 125. After such adjustment has been caused, the flexible track 93 may again be secured against subsequent motion by tightening the several auxiliary adjustment screws 140 to the desired positions, as shown in Figure 1.

*Operation*

In the aforenoted multiple turn cam corrector, the rotational input to be corrected may be applied, as shown in Figures 1 and 3, to a gear shaft 23 resulting in rotation of the input pinion 19, differential housing 27, output pinion 35 and output gear shaft 39. Inasmuch as the differential housing 27 and input pinion 19 affixed thereto are mounted on the screw threaded sleeve 13 spline connected to the fixed shaft 11, it will be seen that upon a rotary movement being imparted to the input pinion 19, there will result linear motion of the differential housing 27 and gear assembly along the axis of the screw threads 15 on the sleeve 13. Due to the combination of rotary and linear motion thus imparted to the differential housing 27, the roller 89 carried thereby is forced to follow the helical track 93.

In the multiple turn cam corrector, shown in Figure 1, five revolutions of the differential housing 27 are required to traverse the full length of the track 93. This expansion of the original input results in an extreme accuracy of control of the corrected input applied by the track 93 and cam roller assembly 89. Pressure of the springs 79 and 101 will require that the roller 89 follow the track's contour. Any departure of the flexible track 93 from its normal diameter in the form of elevations or depressions which may have been brought about by a raising or lowering of certain of the several adjusting screws 125 will cause lateral motion of arm 69 and a corresponding motion of rack 45. Rotation then of the pinion gear 43 imparted thereto by rack teeth 45 will cause rotation of the bevel gears 31 and 29 and in turn pinion 35. Such corrective output will then appear at the output shaft 39.

The change in the contour of the flexible helical track 93 which produces the required corrective action is brought about by adjustment of the several adjustment screws 125 which are located around the barrel 5. Changes in the track length which would occur as the result of raising or lowering the adjusting screws 125 is accommodated by releasing the pressure of the auxiliary adjustment screws 140 on the track 93 and allowing the track 93 to "float" in the several mounting bracket portions 130 prior to any adjustment to the outer body portion 136 of the screw 125. After the adjustment has been completed, the track 93 may be again secured against subsequent motion by tightening the respective auxiliary adjustment screws 140.

A maximum correction curve of 360° rotation of the output gear shaft 39 may be obtained with a maximum allowable screw motion of the adjustment screws 125, of for example of .093 of an inch, with the screw motion such as to decrease the diameter track from its nominal diameter. When increasing the track diameter from the nominal diameter, the maximum allowable screw motion of the adjustment screws 125 may be, for example, .047 of an inch from the nominal diameter position, so as to result in a 180° correction action at the output gear shaft 39.

Accuracy and precision in curve fitting may be effected by a track 93 of a suitable length, of for example 31.4 inches, for the nominal diameter and by the use of the multiple adjustable mounting screws 125, of for example forty-two in number, equally spaced around the barrel 5, as shown in Figures 1 and 3.

Although only one embodiment of the invention has

What is claimed is:

1. A multiple turn cam corrector, comprising an input shaft, an output shaft, a circular barrel having end portions rotatably carrying said input shaft and said output shaft respectively, a flat helical cam track having multiple turns, means for supporting said helical cam track within said barrel, said supporting means including a plurality of adjustable members projecting from an inner surface of said barrel and flange portions at the extremities thereof for carrying the helical cam track so that adjustment of said members may be effective to vary the contour of said helical cam track, another shaft fixedly supported by the end portions of said barrel, said other shaft having screw threads thereon, a differential gearing mechanism screw threadedly engaged with said screw threads and drivingly connecting said input shaft to said output shaft, a cam follower carried by said differential gearing mechanism and traveling on said multiple turn helical cam track for adjusting said differential gearing mechanism and thereby said output shaft relative to said input shaft in accordance with the contour of said helical cam track.

2. The combination defined by claim 1 in which said differential gearing mechanism includes a first bevel gear rotatably carried by said mechanism and drivingly connected to said output shaft, a second bevel gear rotatably carried by said mechanism and operatively engaging said first bevel gear, and means drivingly connecting the cam follower carried by said mechanism to said second bevel gear to impart a corrective adjustment through said first and second bevel gears to said output shaft depending upon the contour at the helical cam track.

3. The combination defined by claim 2 in which the cam follower connecting means includes an arm carrying the cam follower and pivotally mounted on the differential gearing mechanism, spring means biasing said arm and thereby said cam follower into contacting relation with an inner surface of the multiple turn helical cam track, a rack operatively connected to said arm, and slidably mounted in bearings carried by said mechanism, a pinion gear rotatably supported in said mechanism and operatively engaged by said slidable rack and a shaft rotatably supported by said mechanism and drivingly connecting said pinion gear and second bevel gear so as to impart a corrective adjustment through the first and second bevel gears to said output shaft depending upon the contour of the helical cam track.

4. The combination comprising an input shaft, an output shaft, a barrel including means rotatably supporting therein said input and output shafts, a variable contour multi-turn helical track, means for supporting the helical track from an inner surface of the barrel, another shaft fixedly supported within the barrel, said other shaft having screw threads thereon, a variable drive connecting device, said device screw threadedly engaging said screw threads and including differential gearing means drivingly connecting said input shaft to said output shaft and a cam follower carried by said device for adjusting said differential gearing, and said cam follower being arranged in cooperative relation with said helical track for imparting a corrective adjustment to said differential gearing means to move the output shaft relative to the input shaft in accordance with the contour of said helical track.

5. The combination comprising an input shaft, an output shaft, means for rotatably supporting the input and output shafts, a variable contour cam means, another shaft fixedly supported relative to said rotatable input and output shafts, said other shaft having screw threads thereon, a variable drive connecting device rotatably mounted on said other shaft and screw threadedly engaging the screw threads on said other shaft, said device including differential gearing means drivingly connecting said input shaft to said output shaft, a cam follower carried by said device for adjusting said differential gearing means, and said cam follower being arranged in cooperative relation with said variable contour cam means for imparting a corrective adjustment to said differential gearing means to move the output shaft relative to the input shaft in accordance with the contour of said cam means.

6. In a mechanism of a type including an input shaft, an output shaft, a device for drivingly connecting said input and output shafts, said connecting device being rotatable by said input shaft, variable contour cam means, and a cam follower means in contacting relation with said cam means and operative thereby to adjust said connecting device so as to move the output shaft relative to the input shaft; the improvement comprising said connecting device including differential gearing means carried thereby for drivingly connecting said input and output shafts, and means operative by said cam follower means for actuating said differential gearing so as to adjust the output shaft relative to said input shaft in accordance with the contour of the cam means.

7. In a mechanism of a type including an input shaft, an output shaft, a device for drivingly connecting said input and output shafts, said connecting device being rotatable by said input shaft, variable contour cam means, and a cam follower means in contacting relation with said cam means and operative thereby to adjust said connecting device so as to move the output shaft relative to the input shaft; the improvement comprising said connecting device including differential gearing means carried thereby for drivingly connecting said input and output shafts, and means operative by said cam follower means for actuating said differential gearing so as to adjust the output shaft relative to said input shaft in accordance with the contour of the cam means; a fixed screw threaded shaft means cooperating with said connecting device for imparting a linear movement to said device upon the rotation of said device by said input shaft; said cam means including a variable contour multi-turn helical track, and said cam follower means being carried by said connecting device and so arranged as to follow the variable contour of said multi-turn helical track upon the aforesaid linear and rotary movements being imparted to said connecting device and thereby to said cam follower means.

References Cited in the file of this patent

UNITED STATES PATENTS

| | | |
|---|---|---|
| 1,605,805 | Ashbury | Nov. 2, 1926 |
| 2,136,213 | Hodgman | Nov. 8, 1938 |
| 2,514,420 | Shapiro | July 11, 1950 |
| 2,899,831 | Haverland | Aug. 18, 1959 |